US011528677B2

United States Patent
Starsinic et al.

(10) Patent No.: US 11,528,677 B2
(45) Date of Patent: *Dec. 13, 2022

(54) STORING AND RETRIEVING THE NETWORK CONTEXT OF A DEVICE

(71) Applicant: IPLA HOLDINGS INC., New York, NY (US)

(72) Inventors: Michael F. Starsinic, Newtown, PA (US); Rocco Di Girolamo, Laval (CA); Catalina Mihaela Mladin, Hatboro, PA (US); Hongkun Li, Malvern, PA (US)

(73) Assignee: CONVIDA WIRELESS, LLC, Wilmington, DE (US)

( * ) Notice: Subject to any disclaimer, the term of this patent is extended or adjusted under 35 U.S.C. 154(b) by 79 days.

This patent is subject to a terminal disclaimer.

(21) Appl. No.: 17/084,040

(22) Filed: Oct. 29, 2020

(65) Prior Publication Data

US 2021/0045081 A1 Feb. 11, 2021

Related U.S. Application Data

(63) Continuation of application No. 16/337,963, filed as application No. PCT/US2017/054384 on Sep. 29, 2017, now Pat. No. 10,863,471.

(Continued)

(51) Int. Cl.
*H04W 60/00* (2009.01)
*H04L 9/40* (2022.01)
(Continued)

(52) U.S. Cl.
CPC ......... *H04W 60/00* (2013.01); *H04L 63/0807* (2013.01); *H04L 67/141* (2013.01);
(Continued)

(58) Field of Classification Search
CPC ... H04W 12/08; H04W 8/24; H04W 36/0033; H04W 36/0038
See application file for complete search history.

(56) References Cited

U.S. PATENT DOCUMENTS

2016/0006726 A1* 1/2016 Mizikovsky .......... H04L 63/061
713/171

FOREIGN PATENT DOCUMENTS

CN 105793844 A 7/2016
WO 2012/136812 A1 10/2012
(Continued)

OTHER PUBLICATIONS

3GPP TR 23.799 V14.0.0, "3rd Generation Partnership Project; Technical Specification Group Services and System Aspects; Study on Architecture for Next Generation System (Release 14)", Dec. 2016, 522 pages.

(Continued)

*Primary Examiner* — Ayanah S George
(74) *Attorney, Agent, or Firm* — Chip Law Group

(57) ABSTRACT

A network entity may determine whether a network context of a device is stored in the device or in the network based, at least in part, on a preference or capability of the device, as reported by the device during attachment to the network entity. The context may be stored in, and retrieved from, a dedicated context storage function that is independent of the network entity. A context storage function may be partitioned, or separate storage functions used, to automatically group and track access network contexts, core network contexts, or network slice contexts. The context storage function may provide to the device an index, such as a link or other identifier to be used in retrieving the stored context information. The context storage function may further provide a token to secure re-attachment communications among the device, the network entity, and the context storage function.

18 Claims, 10 Drawing Sheets

Related U.S. Application Data

(60) Provisional application No. 62/401,521, filed on Sep. 29, 2016.

(51) Int. Cl.
*H04L 67/141* (2022.01)
*H04L 67/00* (2022.01)
*H04W 4/70* (2018.01)
*H04W 8/24* (2009.01)
*H04W 12/06* (2021.01)
*H04W 36/00* (2009.01)
*H04W 48/00* (2009.01)

(52) U.S. Cl.
CPC ............... *H04L 67/34* (2013.01); *H04W 4/70* (2018.02); *H04W 8/24* (2013.01); *H04W 12/06* (2013.01); *H04W 36/0038* (2013.01); *H04W 48/17* (2013.01); *H04W 36/0033* (2013.01)

(56) References Cited

FOREIGN PATENT DOCUMENTS

| | | |
|---|---|---|
| WO | 2016/044718 A1 | 3/2016 |
| WO | 2016/129238 A1 | 8/2016 |

OTHER PUBLICATIONS

3GPP TS 23.401 V14.0.0, 3rd Generation Partnership Project; Technical Specification Group Services and System Aspects; General Packet Radio Service (GPRS) Enhancements for Evolved Universal Terrestrial Radio Access Network (E-UTRAN) Access (Release 14), 374 pages.

\* cited by examiner

STORING AND RETRIEVING THE NETWORK CONTEXT OF A DEVICE

CROSS-REFERENCE TO RELATED APPLICATIONS

This application is a continuation of U.S. patent application Ser. No. 16/337,963 filed Mar. 29, 2019 which is the National Stage Application of International Patent Application No. PCT/US2017/054384 filed Sep. 29, 2017, which claims the benefit of U.S. Provisional Application No. 62/401,521, filed on Sep. 29, 2016, entitled "Efficiently Storing The Device Context of a Large Number of Devices", the contents of which are hereby incorporated by reference in their entireties.

BACKGROUND

Machine-To-Machine (M2M), Web-of-Things (WoT), and Internet-Of-Things (IoT) network deployments may include 3GPP 5G networks with 5G mobile core network nodes with operations such as network function virtualization and 5G connections establishment. Such operations may include the storage of connection context information, e.g., as described in 3GPP TR 23.799, Study on Architecture for Next Generation System (Release 14).

SUMMARY

A network entity, such as a common core network function (CCNF) may determine whether a network state of a user equipment (UE) is stored in the UE or in the network based, at least in part, on a preference or capability of the UE. For example, the UE may report its preferences or capabilities during attachment. The network context of the UE may be stored in, and retrieved from, a dedicated "context cookie storage function" (CCSF) which is decoupled from the CCNF, allowing greater efficiency and mobility. A CCSF may be partitioned, or separate CCSFs may be used, to automatically group and track, e.g., access network contexts, core network contexts, or network slice contexts, according to the information that is stored in each cookie. The CCSF may provide to the UE a link, index, or identifier for the stored context information, and a related security token, and the link may be hashed. The UE may then present the link, index, or identifier, and the token, to a CCNF during re-attachment. The UE may store multiple links to multiple contexts stored by multiple CCSFs, and select a link to provide to a CCNF based on the identity of the CCNF.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE FIGURES

A more detailed understanding may be had from the following description, given by way of example in conjunction with the accompanying drawings.

DETAILED DESCRIPTION

Figure 1:
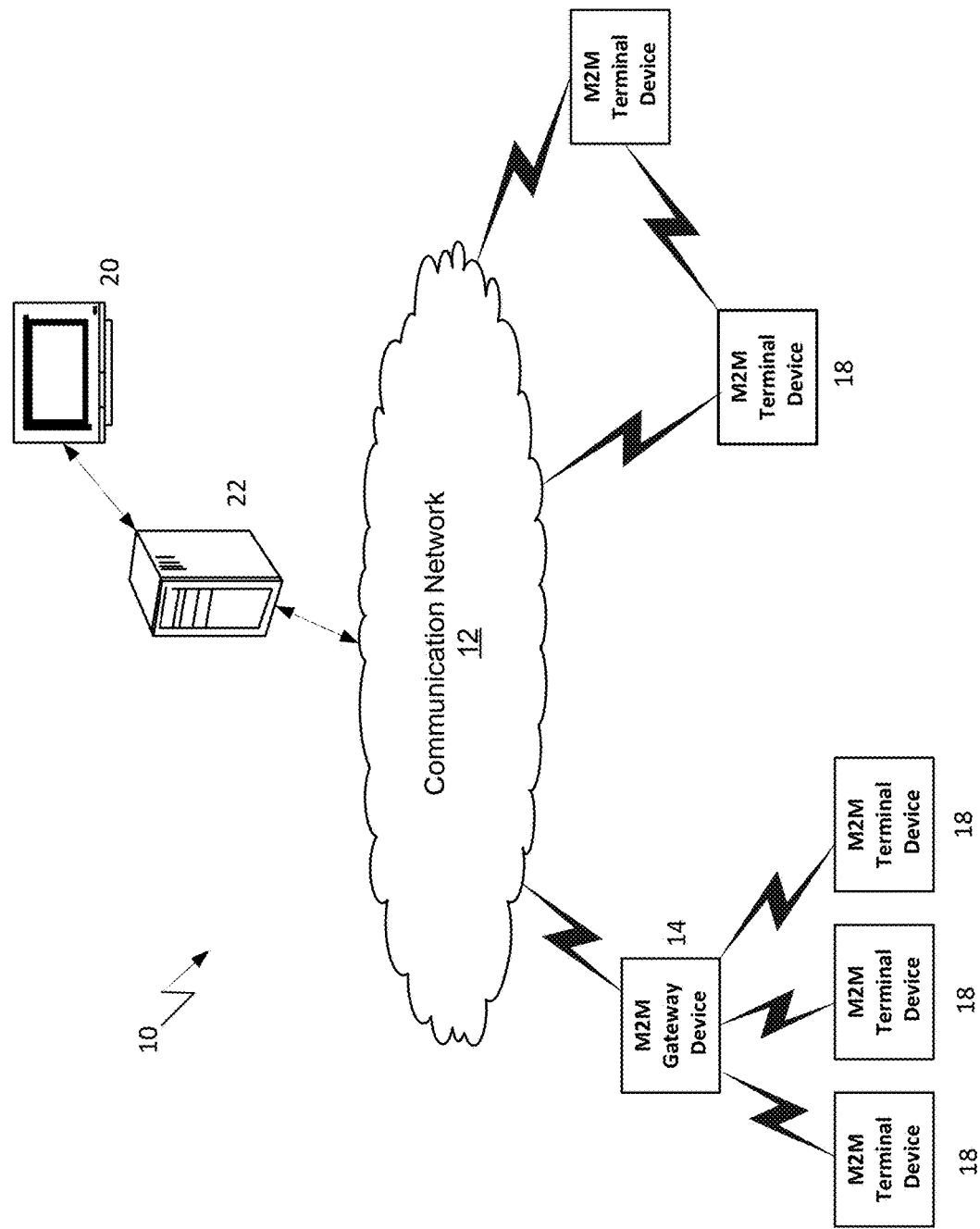
FIG. 1 is a system diagram of an example machine-to-machine (M2M), Internet of Things (IoT), or Web of Things (WoT) communication system in which one or more disclosed embodiments may be implemented.

A network entity, such as a common core network function (CCNF) may determine whether a network state of a user equipment (UE) is stored in the UE or in the network based, at least in part, on a preference or capability of the UE. For example, the UE may report its preferences or capabilities during attachment. The network context of the UE may be stored in, and retrieved from, a dedicated "context cookie storage function" (CCSF) which is decoupled from the CCNF, allowing greater efficiency and mobility. A CCSF may be partitioned, or separate CCSFs may be used to automatically group and track, e.g., access network contexts, core network contexts, or network slice contexts, according to the information that is stored in each cookie. The CCSF may provide to the UE a link, index, or identifier for the stored context information, and a related security token, and the link may be hashed. The UE may then present the link, index, or identifier, and the token, to a CCNF during re-attachment. The UE may store multiple links to multiple contexts stored by multiple CCSFs, and select a link to provide to a CCNF based on the identity of the CCNF.

TABLE 1

Definitions and Abbreviations

| | |
|---|---|
| AN | Access Network |
| AS | Access Stratum |
| CC | Context Cookie |
| CIoT | Cellular Internet of Things |
| CN | Core Network |
| CCNF | Common Control Network Function |
| CCSF | Context Cookie Storage Function |
| NF | Network Function |
| NS | Network Slice |
| MM | Mobility Management |
| MME | Mobility Management Entity |
| NAS | Non-Access Stratum |
| RRC | Radio Resource Control |
| SGSN | Serving GPRS Support Node |
| SM | Session Management |

TABLE 1-continued

Definitions and Abbreviations

| | |
|---|---|
| SSID | Service Set Identifier |
| UE | User Equipment |
| PDN | Packet Data Network |
| PLMN | Public Land Mobile Network |

When a UE connects to the 5G network, it is important to minimize the amount of signaling that is required for the UE to establish its connection with the network. A context cookie solution has been proposed in 3GPP TR 23.799, Study on Architecture for Next Generation System (Release 14). Under 23.799, the UE may connect to the 5G network, after a period of inactivity, by providing a context cookie to the network. The context cookie contains information such as the UE's ID, security context, session information, etc. The network uses the context cookie to reconstruct the state of the UE's connection. This approach allows the network to avoid continuously maintaining or storing UE state while reducing signaling when the UE connects after a lengthy period of inactivity. For example, reconnecting may entail simply having the UE send the context cookie to the network.

In 3GPP Release 13, 3GPP added a Suspend/Resume feature. This feature is also called CIoT User Plane Optimization and is described in 3GPP TS 23.401, General Packet Radio Service (GPRS) enhancements for Evolved Universal Terrestrial Radio Access Network (E-UTRAN) access (Release 14). In this optimization, the eNodeB is able to suspend a UE's RRC connection. When this occurs, the eNodeB, MME and UE store any data related to the UE's S1AP association, UE Context and bearer context. Later, when the connection resume procedure is executed, the UE will resume the connection with the network using the AS information stored during the Connection Suspend procedure. Any signaling needed to reestablish the AS connection may be avoided.

In reference TR 23.799, it has been proposed that in the 5G network, the access network create a resumeID when the UE's RRC connection is suspended and provides the UE's context to the UE. Context is not stored in the access network. Instead, the network only stores the resumeID. Later when the connection is resumed, the UE provide the context and the resumeID back to the access network.

However, TR 23.799 does not address some inefficiencies found with this approach. The term "minimize signaling" is often understood to mean "minimize the number of messages that are sent to/from the UE." However, the underlying motivation to "reduce signaling" is a desire to save spectrum usage by minimizing the amount of data that is sent "over-the-air" and to conserve UE battery life by minimizing the amount of data that needs to be sent and received. By requiring the UE to send a complete state representation to the network, the TR 23.799 approach may cause the UE to send more data and utilize more spectrum then it would have used if it executed a connection procedure that consisted of several steps. This problem becomes particularly important when we consider that many IoT devices may need to connect to the network after long periods of inactivity to send only a small data packet through the network. For example, the context cookie may be larger than the amount of data that the IoT device needs to send.

Simply designing the system to work in a manner that is similar to UTRAN and E-UTRAN, where the SGSN and MME store UE context may not be an appropriate solution. For example, in some situations, a large number of devices connect to a set of network functions for a short amount of time and then go dormant for a long time. The resulting storage requirements make it inefficient to require whatever network functions that the UE last connected to store UE context until the UE connects again. Furthermore, the 5G network is expected to be much more dynamic, for example, with network functions created and deleted based on need. In such cases, it may be inefficient to keep a network function active only because it has UE context for one or more dormant UEs.

Reference TR 23.799 makes a distinction between an AN Cookie and a CN Cookie. The assumption seems to be the CN will contain the necessary state information to allow the UE to reconnect to its Slice(s). However, it may not always be proper to store the information for all slices in the same cookie. In terms of security of the context information, this would imply that a single entity will be able to read the entire cookie and therefore read state information associated with other slices. Also, a UE may not wish to reestablish its connection with all slices at a given time. If it only wants to connect to a single slice, it would be inefficient for the UE to provide a cookie with context information for multiple slices.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

FIG. 1 is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the client, proxy, or server devices illustrated in any of FIGS. 1-9 may comprise a node of a communication system, such as the ones illustrated in FIG. 1, 2, or 6-9.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., one M2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 1, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 1, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 2:
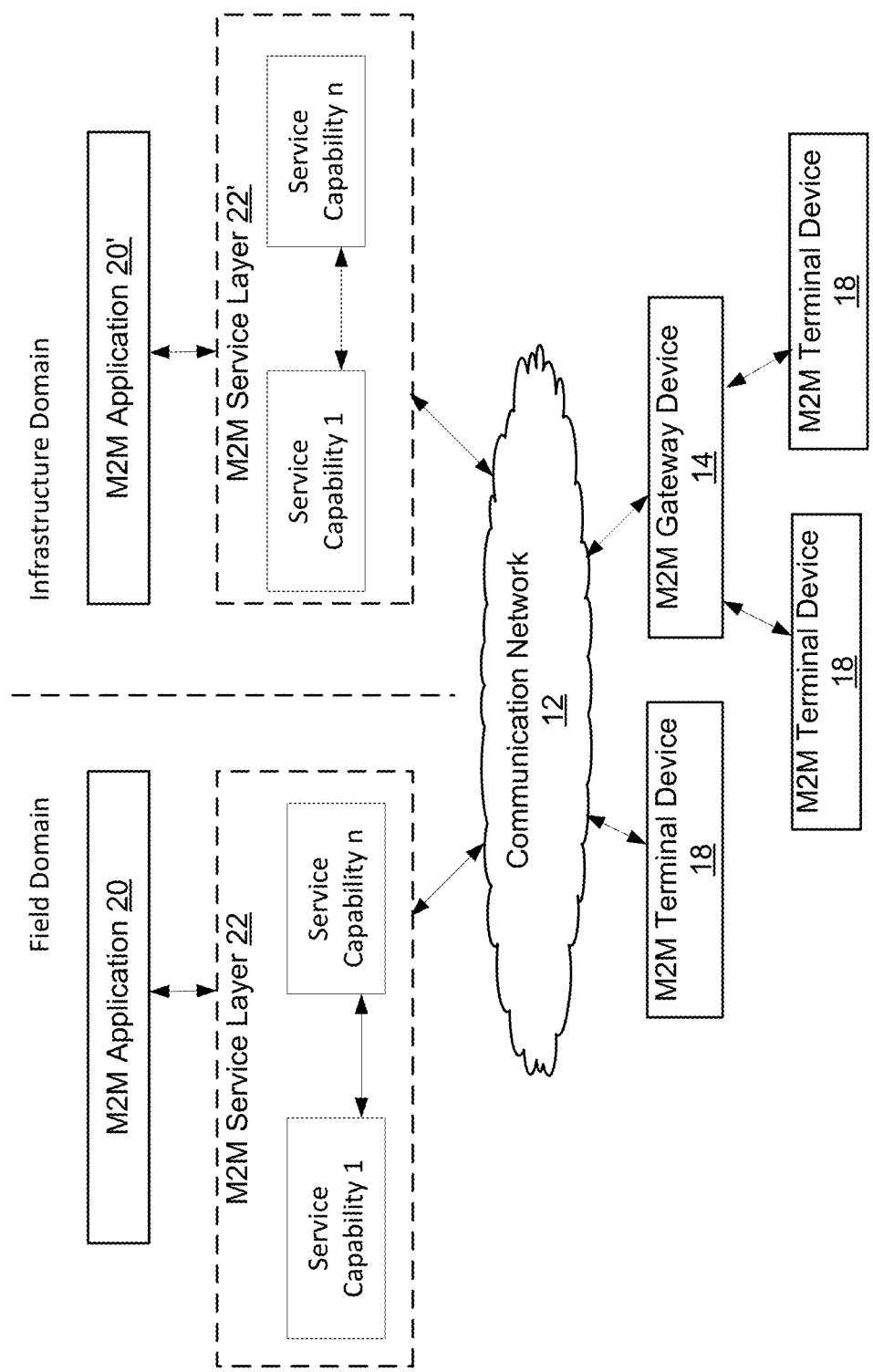
FIG. 2 is a system diagram of an example architecture that may be used within the M2M/IoT/WoT communications system illustrated in FIG. 1.

Referring to FIG. 2, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 2, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 2, defines a software middleware layer that supports value-added service capabilities through a set of Application Programming Interfaces (APIs) and underlying networking interfaces. Both the ETSI M2M and one M2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The one M2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the one M2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIG. 3 or FIG. 4 described below.

Further, the methods and functionalities described herein may be implemented as part of an M2M network that uses a Service Oriented Architecture (SOA) and/or a Resource-Oriented Architecture (ROA) to access services.

Figure 3:
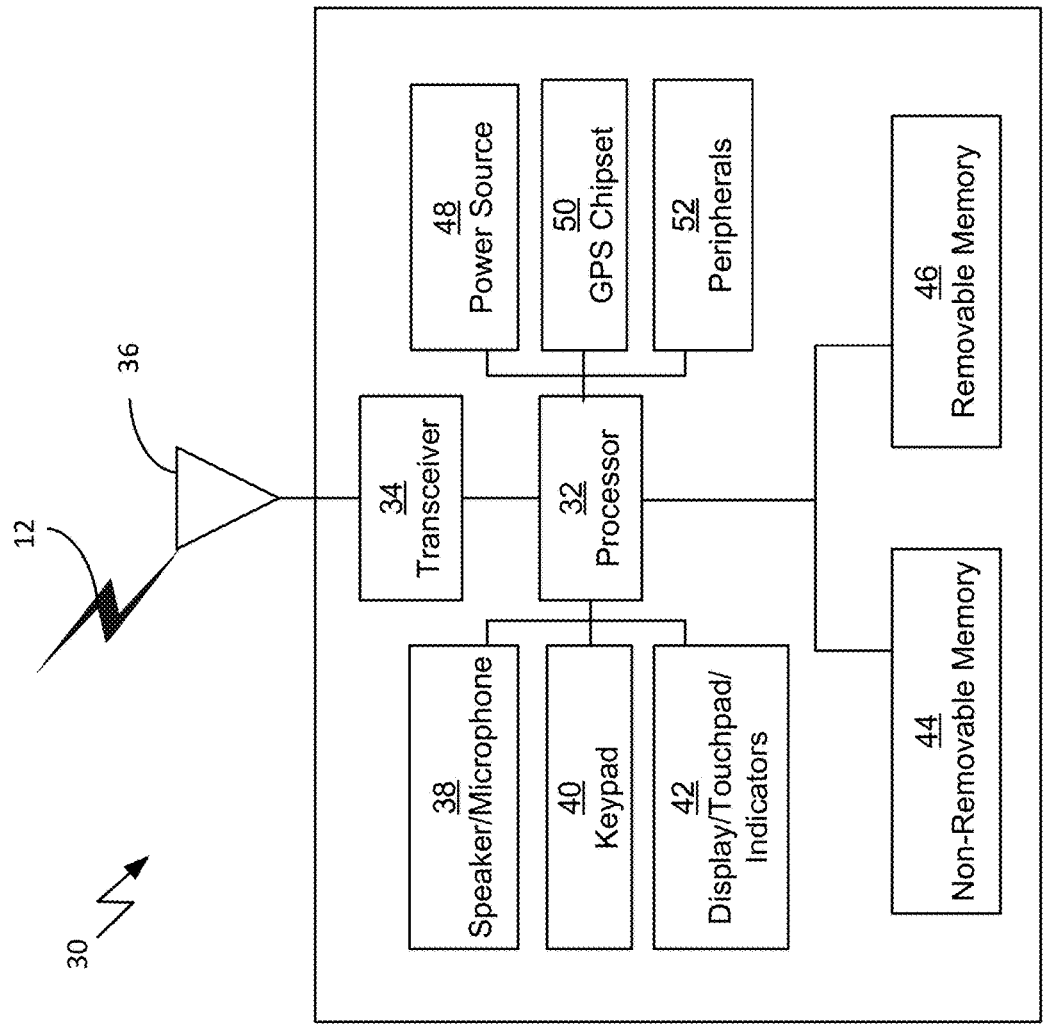
FIG. 3 is a system diagram of an example communication network node, such as an M2M/IoT/WoT device, gateway, or server that may be used within the communications system illustrated in FIGS. 1 and 2.

FIG. 3 is a block diagram of an example hardware/software architecture of a node of a network, such as one of the clients, servers, or proxies illustrated in FIG. 1, 2, or 5-9, which may operate as an M2M server, gateway, device, or other node in an M2M network such as that illustrated in FIG. 1, 2, or 5-9. As shown in FIG. 3, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements context cookie support, e.g., in relation to the methods described in reference to FIGS. 6-10 or the data structures of FIGS. 5, Tables 2-4, or in a claim.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 3, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the context cookie support steps herein, e.g., in relation to FIGS. 5-10, or in a claim. While FIG. 3 depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 3 as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of an M2M Service Layer session migration or sharing or to obtain input from a user or display information to a user about the node's session migration or sharing capabilities or settings. In another example, the display may show information with regard to a session state.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 4:
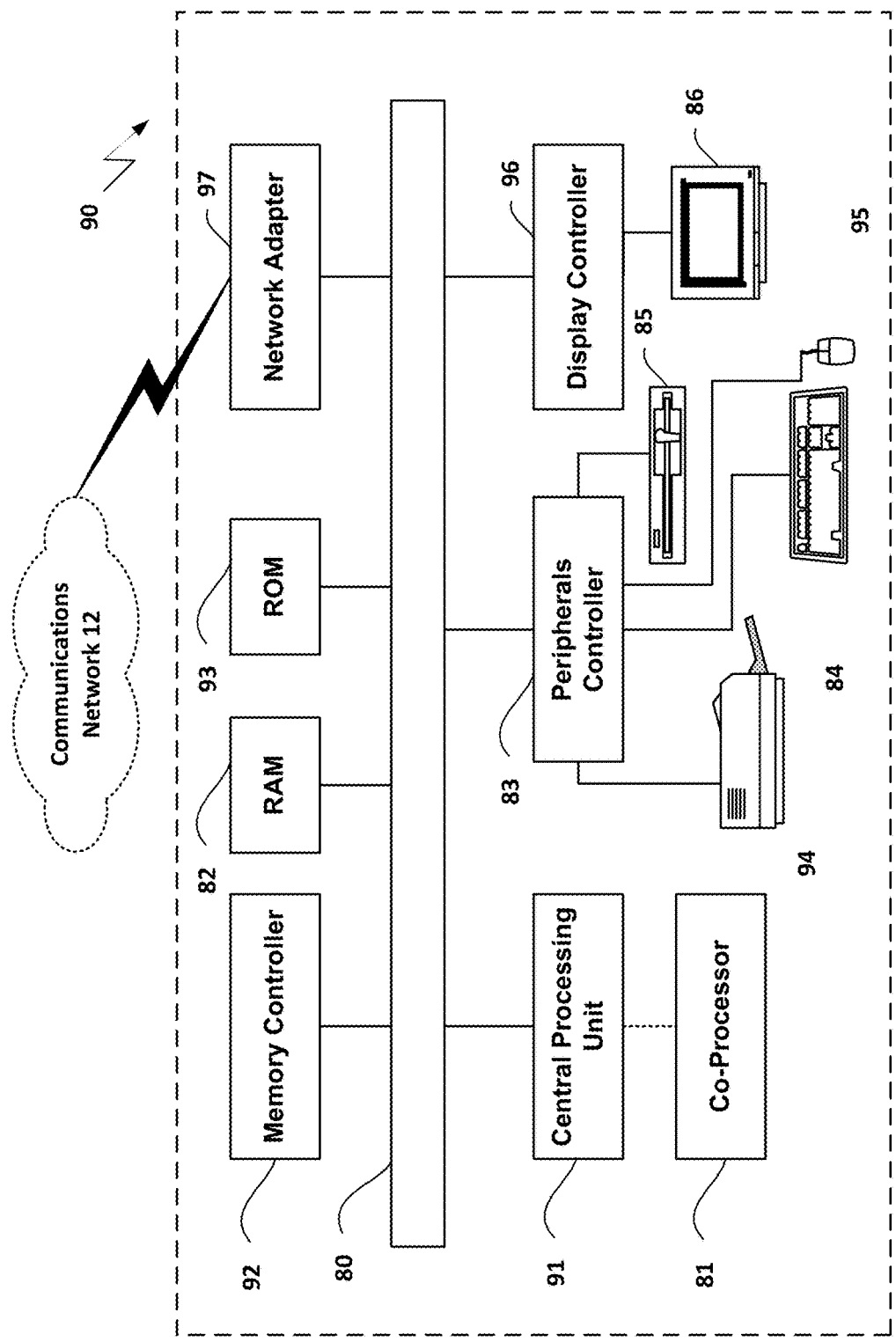
FIG. 4 is a block diagram of an example computing system in which a node of the communication system of FIGS. 1 and 2 may be embodied.

FIG. 4 is a block diagram of an exemplary computing system 90 which may also be used to implement one or more nodes of a network, such as the clients, servers, or proxies illustrated in FIG. 1, 2, or 5-9, which may operate as an M2M server, gateway, device, or other node in an M2M network such as that illustrated in FIG. 1, 2, or 5-9. Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIGS. 1-4, to enable the computing system 90 to communicate with other nodes of the network. The communication circuitry, alone or in combination with the CPU 91, may be used to perform the context cookie support steps herein, e.g., in relation to FIGS. 6-9, or in a claim.

FIGS. 5-10, the descriptions thereof, and the claims herein illustrate various embodiments of methods and apparatuses for enabling the storage and retrieval of connection context information. In these figures, various steps or operations are shown being performed by one or more clients, servers, and/or proxies. It is understood that the clients, servers, and proxies illustrated in these figures may represent logical entities in a communication network and may be implemented in the form of software (i.e., computer-executable instructions) stored in a memory of, and executing on a processor of, a node of such network, which may comprise one of the general architectures illustrated in FIG. 3 or 4 as described herein. That is, the methods illustrated in FIGS. 5-10 and the claims may be implemented in the form of software (i.e., computer-executable instructions) stored in a memory of a network node, such as for example the node or computer system illustrated in FIG. 1 or 2, which computer executable instructions, when executed by a processor of the node, perform the steps illustrated in the figures. It is also understood that any transmitting and receiving steps illustrated in these figures may be performed by communication circuitry (e.g., circuitry 34 or 97 of FIGS. 3 and 4 respectively) of the node under control of the processor of the node and the computer-executable instructions (e.g., software) that it executes.

As described in reference TR 23.799, the 5G core network may have one or more Common Control Network Functions (CCNF). CCNF's may be network functions that are part of the "underlay" network in the sense that they are shared across multiple Network Slices. When a UE initially attaches to the Core Network, it may establish communication with a CCNF for authorization and authentication. It is expected that NAS messaging such as attach requests may be routed through or terminated at a CCNF.

In UTRAN and E-UTRAN, the UE does not store context. The UE's context is stored in the SGSN or MME that it was last attached to. When the UE attaches to a new SGSN or MME, the UE gives the new SGSN or MME information that it may use to resolve the identity of the old SGSN or MME that is still storing the UE's context. The new SGSN or MME may then fetch the context from the old SGSN or MME. An example disadvantage to this approach is that if a large group of IoT devices connect to a single MME for a short period of time to send a small amount of data, and then wish to disconnect from the network for a long period of time, the MME may be expected to store the contexts of all the IoT devices for long time periods.

Rather than requiring that a UE send a full state representation to the network to reestablish a connection, the UE and network may instead optionally configure the UE's connection such that the state representation is stored in the network or another resource that is accessible to network devices. This alternative requires that the network provide memory resources to store the state representation. However, this problem may be reduced by designing the network such that the UE's state representation may be stored in a separate repository.

A UE and network may configure whether a UE's connection state is stored in the UE or in the network. This configuration may be on a per-slice basis, for example. Additionally, when state is stored in the network, the UE's state representation may be stored in a separate repository or even off network. State information should be stored such that the state information that is associated with each slice is stored separately or at least stored such that a network function from one slice may be prevented from retrieving state information that is associated with another slice.

Figure 5:
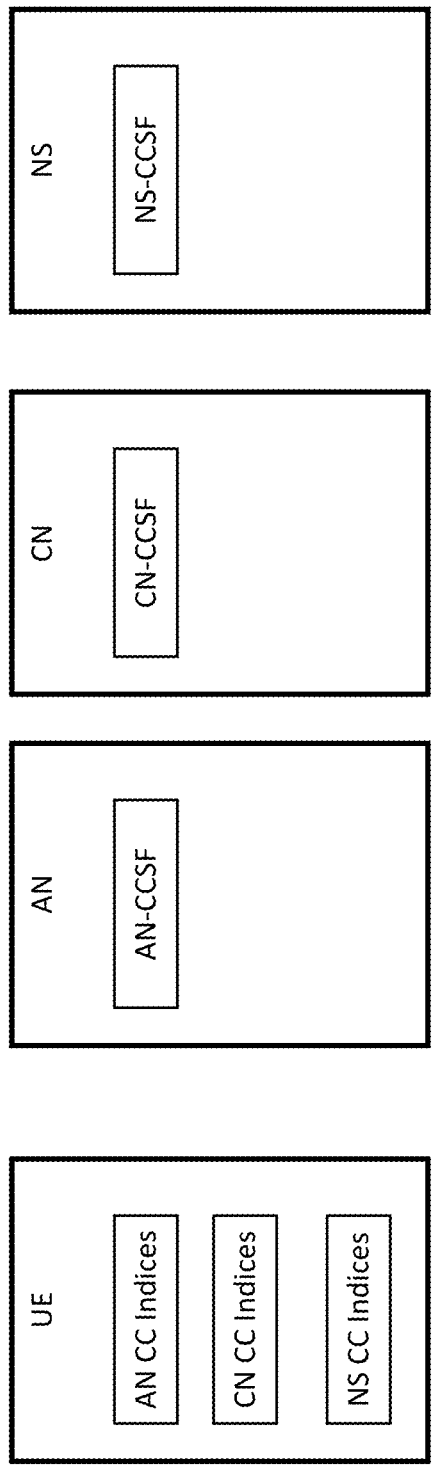
FIG. 5 shows example network entities that have repositories for storing UE context.

FIG. 5 shows a representation of how context cookie maybe stored by the network. The Access Network (AN), Core Network (CN), and Network Slice (NS) may each have their own repositories for storing UE context. The UE may maintain a context cookie index (or identifier) for each AN, CN, and NS that it connects to. For example, the UE may store an AN Index for each PLMN and SSID that it connects to and it may store a context cookie for each network slice that it connects to.

When the UE connects to an AN, it uses the AN identifier (e.g., SSID or PLMN ID or RAN ID) to determine what AN CC Index to provide to the network. When the UE connects to the CN, it uses the CN identifier (e.g., PLMN ID) to determine what CN CC Index to provide to the network. When the UE connects to a NS it uses the NS identifier, Service Descriptor, or desired type of service to determine what NS CC Index to provide to the network.

It may be advantageous to store the context information associated with the AN, CN, and each Network Slice in separate context cookies. Network Slice cookies may be kept separately, e.g., because network slices may not be generally aware of each other and should operate independently. The AN and CN context cookies may be kept separate because a UE may use ANs of different types, e.g., owned by different operators to connect to the same Core Network. The AN and CN contexts may be viewed as one network. In such a scenario, there would be one combined AN and CN index and one combined AN and CN CCSF.

Figure 6:
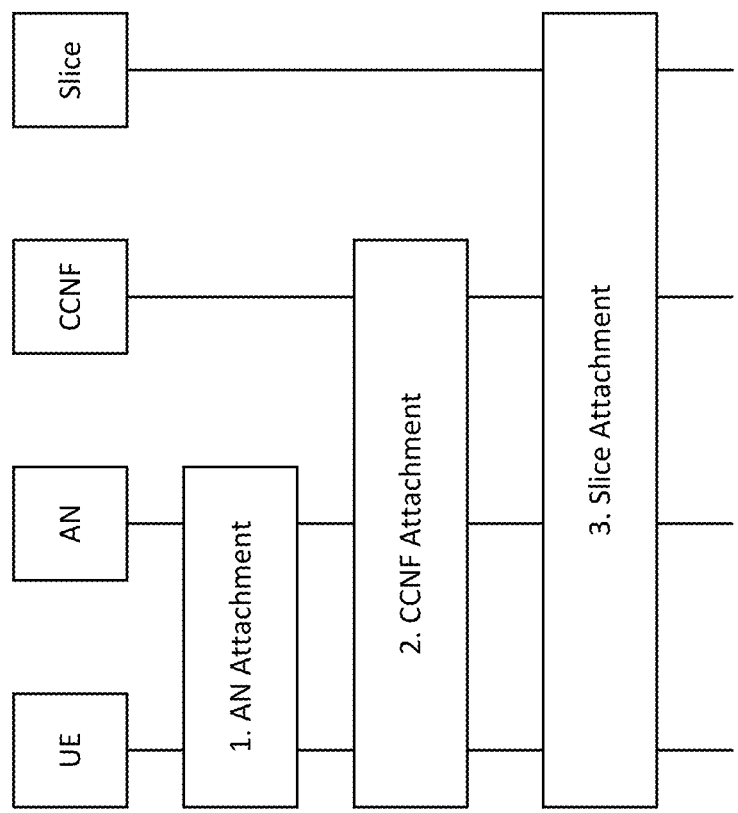
FIG. 6 shows an example call flow for creation of a context cookie.

FIG. 6 shows an example call flow for the attachment of a UE to AN, a CCNF, and a network slice. This flow may include the creation of a context cookie. A UE's attachment to the 5G network may generally be considered a three step process. First the UE attaches to the AN. Then the UE attaches to a set of common core network functions. Finally the UE attaches to one or more network slices to obtain services. These steps may be merged. For example, the UE may obtain services from the common core network functions. In such an example, the common core network functions may be considered a "slice".

Prior to connecting to an Access Network, the access network may broadcast whether or not it supports connectivity via UE-supplied context cookies. Similarly, prior to connecting to a Core Network, the core network may broadcast whether or not it supports connectivity via UE supplies context cookies.

In step 1 of FIG. 6, when the UE attaches to the access network, it may indicate to the network if it is capable of storing an AN context cookie. After an access network connection is established, the AN may provide the AN context cookie to the UE. Delivery of the AN context cookie to the UE may be triggered by the UE successfully authenticating with a CCNF or the AN successfully authenticating the UE, or the access network successfully authenticating an AN context cookie that was provided by the UE. The AN context cookie may contain information such as the items listed in Table 5-1. Alternatively, the UE may indicate that it would like the AN to store the context cookie. The AN may reply with an indication of whether the cookie should be stored in the UE or on the AN. The AN would then not provide the UE with the context cookie, instead it may store the cookie in the AN-CCSF and provide an identifier or link to UE. The UE may later provide the identifier or link back to the AN so that the AN may retrieve the cookie from the AN-CCSF. When the AN provides the cookie identifier, or index, to the UE, it may also provide an AN context cookie token to the UE. This token may not be provided back to the network by the UE. Instead, the AN may provide the token to the UE again when the cookie is later retrieved. The UE may check that the same token is provided in order to authenticate the context cookie and authenticate the AN. Instead of determining the cookie storage location based on an indication from the UE, the AN may determine the cookie storage location based on an indication from a CCNF. For example this information may be based on the UE's subscription information.

In step 2, when the UE attaches to a common core network function, such as the CCNF, it may indicate to the network if it is capable of storing a CN context cookie. After a CN connection is first established, the CN may provide the CN context cookie to the UE. Delivery of the CN context cookie to the UE may be triggered by the UE successfully authenticating with a CCNF or the CN successfully authenticating the UE, the CN successfully authenticating a CN context cookie that was provided by the UE, or the UE successfully connecting to one or more network slices. The CN context cookie may contain information such as the items listed in Table 3. Alternatively, the UE may indicate that it would like the CN to store the CN context cookie. The CN may reply with an indication of whether the cookie should be stored in the UE or on the CN. The CN would then not provide the UE with the context cookie, instead it may store the cookie in the CN-CCSF and provide an identifier or link to UE. The UE may later provide the identifier or link back to the CN so that the CN may retrieve the cookie from the CN-CCSF. When the CN provides the cookie identifier, or index, to the UE, it may also provide a CN context cookie token to the UE. This token may not be provided back to the network by the UE. Instead, the CN may provide the token to the UE again when the cookie is later retrieved. The UE may check that the same token is provided in order to authenticate the context cookie and authenticate the AN. If a different token, or no token, is provided to the UE, then the UE may end the procedure and attempt to connect to a different AN. Instead of determining the cookie storage location based on an indication from the UE, the CN may determine the cookie storage location based on an indication from a CCNF. For example this information may be based on the UE's subscription information.

In step 3, when the UE attaches to a NS, it may indicate to the NS if it is capable of storing an NS context cookie for the slice. For example, this may be indicated by the UE to the SM NF during session establishment. Alternatively, this may be indicated to the SM in the UE's subscription profile. After a NS connection is established, the NS may provide the NS context cookie to the UE. Delivery of the NS context cookie to the UE may be triggered by the UE successfully authenticating with the Slice, the NS successfully authenticating a NS context cookie that was provided by the UE, or the UE successfully connecting to the NS. The NS context cookie may contain information such as the items listed in Table 4. Alternatively, the UE may indicate that it would like the NS to store the context cookie. The NS may reply with an indication of whether the cookie should be stored in the UE or on the NS. The NS would then not provide the UE with the context cookie, instead it may store the cookie in the NS-CCSF and provide an identifier or link to UE. The UE may later provide the identifier or link back to the NS so that the NS may retrieve the cookie from the NS-CCSF. When the NS provides the cookie identifier, or index, to the UE, it may also provide an NS context cookie token to the UE. This token may not be provided back to the network by the UE. Instead, the NS may provide the token to the UE again when the cookie is later retrieved. The UE may check that the same token is provided in order to authenticate the context cookie.

Alternatively, a UE may be capable of storing a cookie on the UE itself. Such a UE may indicate to the network whether it prefers the cookie to be stored in the network or the UE. When the preference is indicated, a procedure maybe initiated where the cookie is stored in the network or on the UE.

A context cookie may need to be updated to address, for example, UE mobility, a change in anchor point, or load balancing. If a UE changes its point of attachment in the access network, associated changes in AN CC, CN CC, and NS CC may be required. Similarly, if a core network decides to use a more efficient user plane path for a UE, the CN CC and the NS CC may be changed. A core network may "move" UEs from one network slice to another for load balancing reasons, again requiring the CN CC and the NS CC may be changed.

To effect a change, the core network may need to retrieve the context cookies for the impacted UEs. The core network may issue search requests to the storage containers to find specific cookies. For example, the core network may ask for: all cookies that have a context that is impacted by a change in a specific network function (for example a specific SM network function); all cookies belonging to a specific UE (for example based on MSISDN); or all cookies that are related to a specific session belonging to a UE (for example based on a PDU session ID or bearer ID).

If a context cookie needs to be updated, the core network may do this autonomously. For example, to update a context cookie autonomously, after retrieving the relevant cookie, the core network may modify the cookie, and then update the stored cookie in the CSSF. For some contexts, the core network may also inform the UE that one or more of its context cookies has been modified and provide the UE with an updated token and index.

Alternatively, to update a cookie, the core network may trigger a context cookie update method. Such a method may include five steps, for example. First, the core network may signal to the UE that a context needs to be changed, and supply the UE with the details of this changed context. Second, the UE may then initiate a context cookie update request with the core network. Here, the UE provides the core network with the index to the old context cookie. Third, the core network retrieves the old context cookie. Fourth, the core network updates the context cookie based on the UE request, and stores the update in the storage container. Last, the core network acknowledges the context cookie update request and provides the UE with a new index, a new token, and the old token. If the old token does not correspond to the value that was expected by the UE, then the UE may consider the new token and index invalid and indicate to the network that the new token and index have not been accepted.

Context cookies may be stored in one or more central context storage functions which are decoupled from other network functions. Dividing storage and other functionalities allows each to be scaled and to operate more efficiently. For example, by using separate storage, the number of UE's that an MM function can serve need not be affected by the number of UE's that the MM function has recently served, since the MM function may not need to store context information for the UEs that it has served in anticipation of them reconnecting.

A single type of storage function may be used. Alternatively, a different type of storage function may be created for each type of context cookie. For example, types of storage functions may include an AN Cookie Storage Function, a CN Cookie Storage Function, and a Network Slice Cookie Storage Function.

There may be multiple instances of each type of storage function. For example, a network operator may have multiple instances of storage functions for AN cookies, multiple instances of storage functions for CN cookies, and multiple instances of storage functions for NS cookies.

When a context cookie is formed, it may be stored in a storage function and an index may be created. The index is one or more values that may be later used to retrieve the cookie. The index may consist of a link, URI, storage location ID, and/or temporary ID. Or it may be a combination of an index and storage function ID.

An expiration time may also be associated with the index and the stored cookie. The expiration time and index may be provided to the UE. Later, when the UE wishes to re-establish the context, the UE may provide the index back to the network so that the network may retrieve the cookie.

The index may allow the network to find the storage location and the cookie within the storage location. For example, the index may be URI that resolves to a particular node that stores cookies and a particular resource within that node that stores an instance of a cookie.

CCSF's are logical functions that may reside alongside or as part of other functions. For example, the context information may be stored as part of the UE's subscription data. Similarly, the identities of the CCSF's that hold cookies for the UE may be part of the UE's subscription data. For example, when a cookie is stored in a CCSF, the function that stored the cookie may also update the UE's subscription data with an identity of the CCSF that holds the cookie and an expiration time, a token, and an index.

Alternatively, the index allows the network to find the storage location of the cookie, but the network needs to use some other identifier to find the cookie within the storage location. For example, the network may use some UE identifier, such as the MSISDN, to find the cookie(s) associated with the UE.

Figure 7:
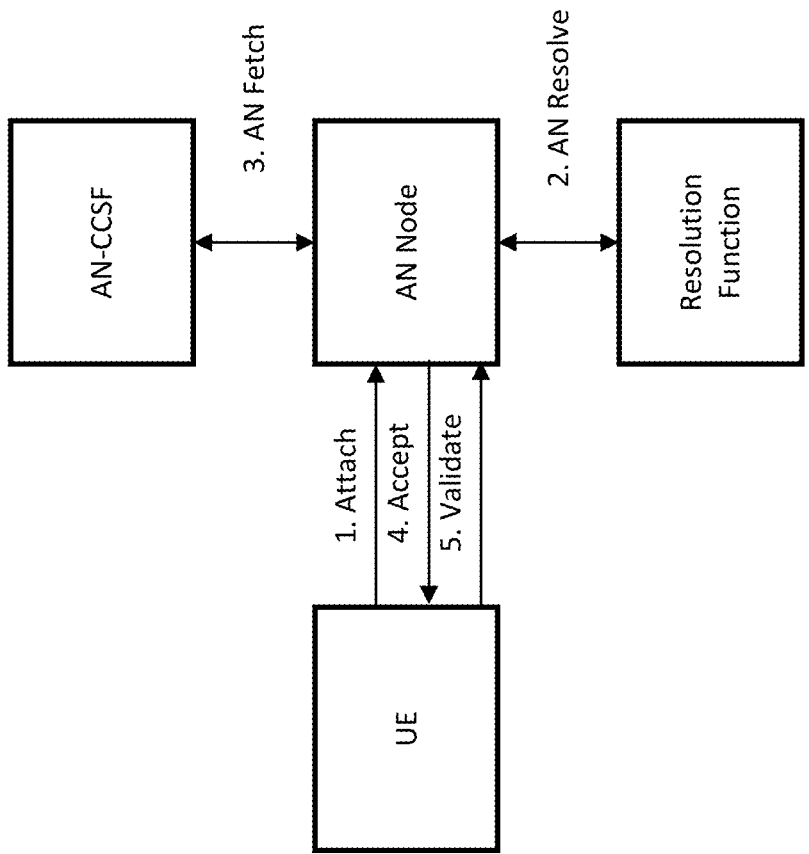
FIG. 7 illustrates example communications among network entities where a UE is re-attaching to a network and using a previously created cookie to reestablish its context.

A context cookie may be stored in an access network context cookie storage function (AN-CCSF). An example method for a UE making an attach request, an AN resolving the location of the context cookie, and the AN retrieving the context cookie is illustrated in FIG. 7. FIG. 7 shows the case where the UE is re-attaching to the network and using a previously created cookie to reestablish its context. The AN-CCSF may be a function that is considered part of the access network. It may also be considered part of the underlay network in the sense that it might not be part of a particular slice.

As in the example of FIG. 7, when a UE attaches to an AN, it may provide the AN with an index that may be used to retrieve the UE's context cookie. The UE may choose to provide the index based on the fact that it knows that it is connecting to the same AN that it previously connected to. For example, the UE may decide to provide the index because it is connecting to the same PLMN or SSID that it previously connected to. When connecting to a network that it has never previously connected to, the UE may make a connection without using a previously established context cookie.

Upon receiving an AN context cookie index from the UE, the AN may resolve the index to a particular AN-CCSF instance and further resolve it to a cookie within the storage function. Once the cookie is retrieved, the AN context may be restored. If no context cookie may be resolved from the provided index, then the AN may reply to the UE with an indication that context could not be found and that a full re-attachment procedure is needed.

The AN may determine the identity of the UE's CCNF based on the identity that was provided by the UE in the attach request. Alternatively, the identity of the CCNF may be indicated in the AN context cookie. The CCNF may be contacted after establishing, or restoring, the AN context.

FIG. 7 shows an example of a re-attach to an AN. In step 1, the UE makes an attach, an RRC connection request, or an association request to an AN node. The request includes a context cookie index. The presence of the index serves as an indication to the AN that an AN context for the UE is stored in an AN-CCSF and the index may be used to retrieve the context. In step 2, the AN resolves the index to a storage location. For example, if the index is a URI, then this step may be a DNS lookup to resolve the IP address of the AN-CCSF. In step 3, the AN provides the index of the cookie to the AN-CCSF and the AN-CCSF provides to the context cookie to the AN. In step 4, the AN node responds to the UE's attach, or association, request and provides an indication that the UE's context has been successfully retrieved. This confirmation may also include a token that the UE may use to authenticate the AN node and/or verify that the context cookie that was retrieved by the AN is authentic. In step 5, the UE sends a validation message to the AN to indicate that it has checked the token and has validated that the token is associated with a valid AN context cookie.

Figure 8:
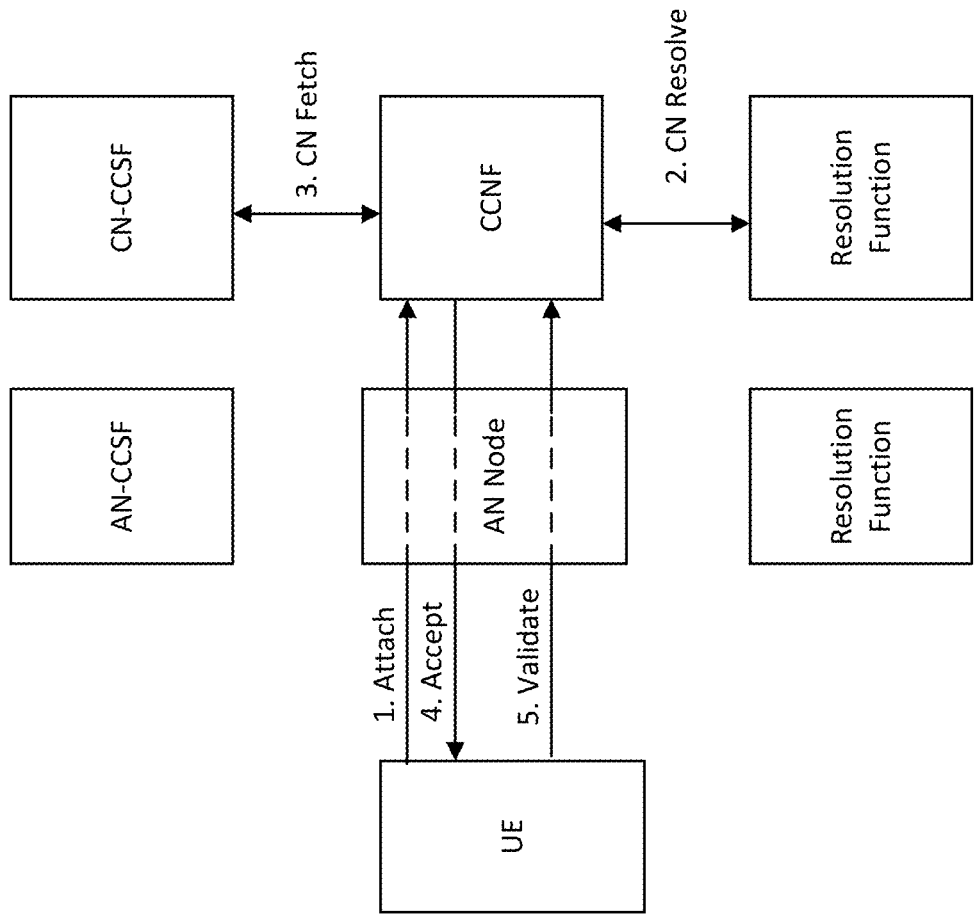
FIG. 8 illustrates example communications among network entities where a UE re-attaches to a core network.

FIG. 8 shows the case where the UE is re-attaching to the network and using a previously created cookie to reestablish its context. A Core Network Context Cookie Storage Function (CN-CCSF) may be a function that is considered part of the access network or core network. It may also be considered part of the underlay network in the sense that it might not be part of a particular slice.

As shown in FIG. 8, when a UE attaches to a CN, it may provide the CN with an index that may be used to retrieve the UE's context cookie. The UE may choose to provide the index based on the fact that it knows that it is connecting to the same CN that it previously connected. For example, the UE may decide to provide the index because it is connecting to the same PLMN that it previously connected to. In a situation where the UE is connecting to a PLMN that is different than what it previously connected, the UE may choose to provide no index so that new context may be generated or it may choose to provide a different index. Alternatively, the index may be provided to the new network and the new network may fetch the context from the old network. This may happen for example in an emergency situation when the UE decides to connect to an emergency (e.g., TOPS) PLMN.

Upon receiving a CN Context Cookie index from the UE, the CCNF may resolve the index to particular CN-CCSF instance and further resolve it to a cookie within the storage function. Once the cookie is retrieved, the UE's CN context may be restored. If no context cookie may be resolved from the provided index, then the CN may reply to the UE with an indication that context could not be found and that a full re-attachment procedure is needed.

The CN may determine the Slices that the UE connection may be based on the context that is retrieved from the CN-CCSF and it may obtain pointers to the UE's slice context cookies.

FIG. 8 illustrates example communications among network entities where a UE re-attaches to a core network. In step 1, the UE makes an attach request to a core network. The request may terminate at the CCNF. The request includes a context cookie index. The presence of the index serves and as an indication to the CCNF that CN context for the UE is stored in a CN-CCSF and the index may be used to retrieve the context. In step 2, the CCNF resolves the index to a storage location. For example, if the index is a URI, then this step may be a DNS lookup to resolve the IP address of the CN-CCSF. In step 3, the CCNF provides the index to the CN-CCSF and the CN-CCSF provides to the context cookie to the CCNF. In step 4, the CCNF responds to the UE's attach request and provides an indication that the UE's context has been successfully retrieved. This conformation may also include a token that the UE may use to authenticate the CCNF and/or verify that the context cookie that was retrieved by the CCNF is authentic. In step 5, the UE sends a validation message to the CCNF to indicate that it has checked the token and has validated that the token is associated with a valid CN context cookie.

Figure 9:
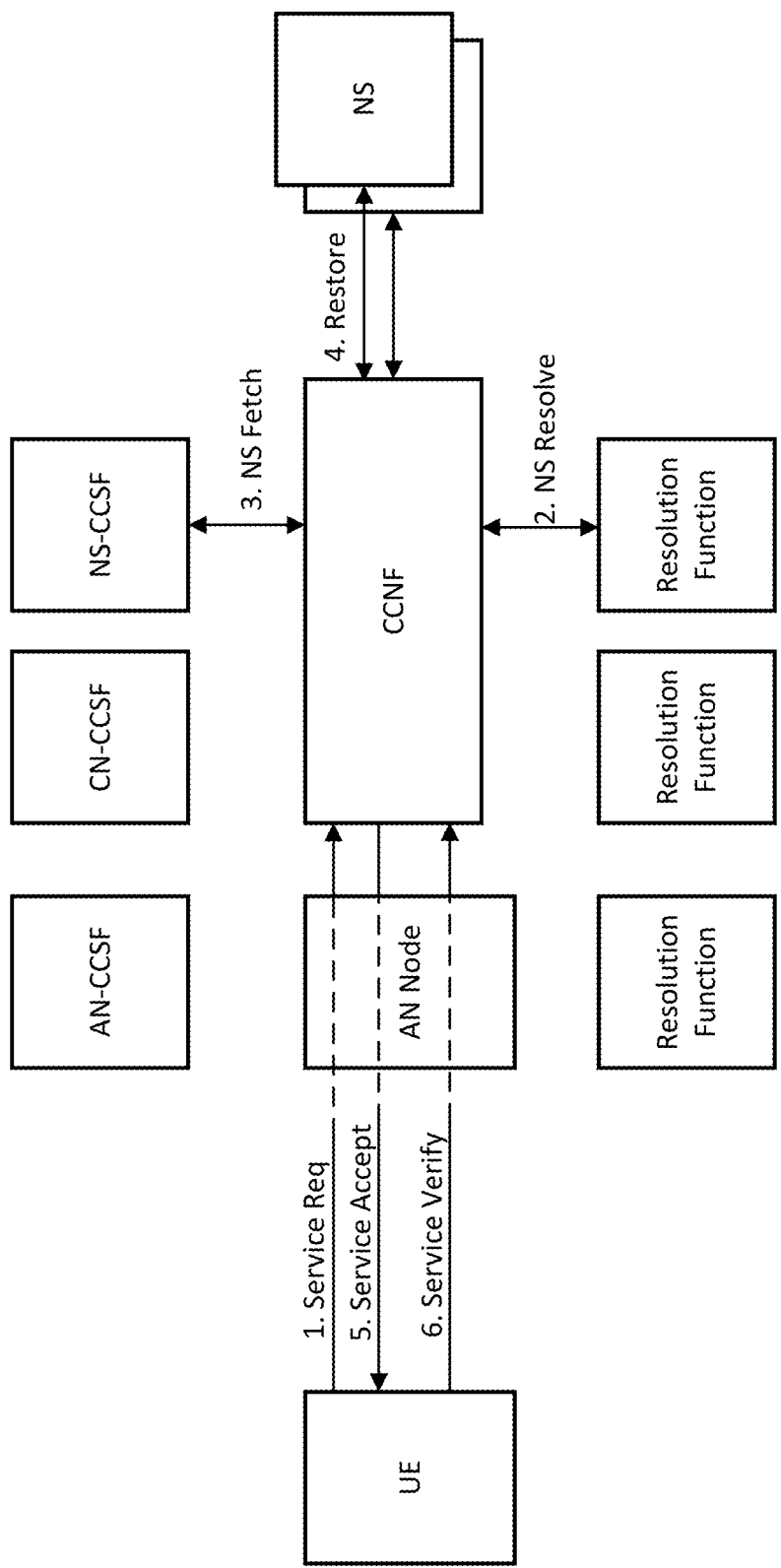
FIG. 9 illustrates example communications among network entities where a UE re-attaches to a network slice.

FIG. 9 illustrates example communications among network entities where a UE re-attaches to a network slice. As shown in FIG. 9, when a UE wants to obtain services, it may provide the CCNF with a description of the services that it wants to obtain, the name of the slice that it wants to connect to, a context cookie that may be used to restore its connection to a slice, or an index to a context cookie that may be used to restore its connection to a slice. FIG. 9 shows the case where the UE is re-attaching to the network and using a previously created cookie to reestablish its context.

When a UE attaches to a CN, it may provide the CN with an index that may be used to retrieve the UE's context cookie. The UE may choose to provide the index based on the fact that it knows that it is connecting to the same CN that it previously connected. For example, the UE may decide to provide the index because it is connecting to the same PLMN that it previously connected to. In a situation where the UE is connecting to a PLMN that is different than what it previously connected, the UE may choose to provide no index so that new context may be generated or it may choose to provide a different index. This may happen for example in an emergency situation when the UE decides to connect to an emergency (e.g., TOPS) PLMN.

When the UE attaches, it may provide the CCNF with an index that may be resolved to its slice context information. The context information may then be used to allow the UE to connect to the same slice(s) that it previously connected to slices that provide similar services.

When connecting to a slice and restoring a UE's context, the UE may be attached to the same user plane anchor and associated with the same messaging center (e.g., SMS-SC) so that the UE may use the same user plane address (e.g., MSISDN, IP Address, URI) and access the same data network.

The process of the UE making an attach request, the CCNF resolving the location of the context cookie and the CCNF retrieving the context cookie is illustrated in FIG. 7. The NS-CCSF may be a function that is considered part of the access network or core network. It may also be considered part of the underlay network in the sense that it might not be part of a particular slice.

Upon receiving a CN Context Cookie index from the UE, the CCNF may resolve the index to particular NS -CCSF instance and further resolve it to a cookie within the storage function. Once the cookie is retrieved, the UE's NS context may be restored. If no context cookie may be resolved from the provided index, then the CN may reply to the UE with an indication that context could not be found and that a full re-attachment procedure is needed.

The CN may determine the slices that the UE was connected to be based on the context that is retrieved from the NS-CCSF, and it may obtain pointers to the UE's slice context cookies.

The context cookie may be structured, for example, in three parts: AN, CN, and NS. Alternative, data may be stored in three separate cookies. The cookies may be structured in other ways. For example, the AN and CN cookies may be combined and retrieved as part of a core network attach procedure or a combined access network and core network attach procedure.

There may be other types of context cookies or the cookies may be customized per device type. For example MTC-type cookies may be customized to include less information so that a reduced amount of data would be exchanged between the UE and network.

An AN index may be used to retrieve the cookie from the CCSF. The AN Context cookie may hold information such as the items listed in Table 2. The access network cookie holds context specific to reconstructing a UE's connection to a particular access network.

TABLE 2

AN Context Cookie Fields

| Element Name | Description | Example |
|---|---|---|
| UE ID | The identity of the UE associated with the cookie. | IMSI, IMSI-Group-ID, External ID, MSISDN |
| Expiration Time | The expiration time of the cookie. | Mar. 12, 2017 |
| AN Type | The name of the Access Network Type | 3GPP, Wi-Fi, UTRAN, E-UTRAN, New 5G Radio (NR), 5G, etc. |
| AN Identifier | Identity of the specific AN | PLMN ID, SSID |
| Last Attachment Point | The identifier of the AN node that the UE was attached to when the cookie was last updated. | eNodeB Identifier, Wi-Fi AP identifier, Wi-Fi WLC identifier. |
| Token | A token that was provided to the UE when the index was provided to the UE. | A random number or a hash of a random number and the UE's identity. |
| Location | Geographic location information, may be last attachment location info, current location or both | GPS info |
| Mobility | Information about mobility state, may be measured, pre-provisioned mobility mode or rough indication | Pre-provisioned mode: Static/Nomadic/Low-speed/High-speed Measured: current speed Indicator: High/Low speed (state) |
| Security Context | Information that may be used by the Access Networks to authenticate the UE | If the cookie contained a random security challenge when it was provided to the UE, the UE may insert a challenge response when it is provided back to the network. If the cookie is stored in the network, it may include a random challenge and expected result from the UE. |

TABLE 2-continued

AN Context Cookie Fields

| Element Name | Description | Example |
|---|---|---|
| Session Context | Information about each access network session, such as anchor point and the UE's access network ID. | |

An CN index may be used to retrieve the cookie from the CCSF. The CN Context cookie may hold the information such as the items listed in Table 3. The common core network cookie holds context specific to reconstructing a UE's connection to a particular core network.

A core network context cookie may optionally identify what slices, or services, the UE obtained from the network. When the connection with the core network is re-established, the UE's connections to the slices may be re-established or the UE may be connected to different slices that provide the same services as the slices that the UE last requested

TABLE 3

Common Core Network Context Cookie Fields

| Element Name | Description | Example |
|---|---|---|
| UE ID | The identity of the UE associated with the cookie. | IMSI, IMSI-Group-ID, External ID, MSISDN |
| Expiration Time | The expiration time of the cookie. | Mar. 12, 2017 |
| CN Type | The name of the Core Network Type | EPC, NextGen/5G, etc |
| CN Identifier | Identity of the specific CN | PLMN ID |
| Last Attachment Point | The identifier of the CN node that the UE was attached to when the cookie was last updated. | MME and/or S-GW, CCNF, NSSF, etc. |
| Slice ID's | Identifiers of the slices that the UE was attached to. | |
| Service Descriptors | Descriptions of the services that the UE obtained when last connected to the network. | |
| Token | A token that was provided to the UE when the index was provided to the UE. | A random number or a hash of a random number and the UE's identity. |
| Location | Geographic location information, may be last attachment location info, current location or both | GPS info |
| Mobility | Information about mobility state, may be measured, pre-provisioned mobility mode or rough indication | Pre-provisioned mode: Static/Nomadic/Low-speed/High-speed Measured: current speed Indicator: High/Low speed (state) |
| Security Context | Information that may be used by the Core Networks to authenticate the UE | If the cookie contained a random security challenge when it was provided to the UE, the UE may insert a challenge response when it is provided back to the network. If the cookie is stored in the network, it may include a random challenge and expected result from the UE. |
| Session Context | Information about each access network session, such as anchor point and the UE's network ID, IP address, tunnel identifiers that may be associated with the UE's sessions, etc.. | |

An NS index may be used to retrieve the cookie from the CCSF. The NS Context cookie may hold the information that is listed in Table 4. The network slice cookie holds context specific to reconstructing a UE's connection to a particular network slice.

An NS Context Cookie may be used to construct a UE's connection to a different NS than the NS that the UE was connected to when the cookie was created. For example, the cookie may describe what services the UE obtained from the slice and may be used to construct a connection to a slice that provides the same services. A similar approach may be used for AN and CN context cookies.

TABLE 4

Network Slice Context Cookie Fields

| Element Name | Description | Example |
| --- | --- | --- |
| UE ID | The identity of the UE associated with the cookie. | IMSI, IMSI-Group-ID, External ID, MSISDN |
| Expiration Time | The expiration time of the cookie. | Mar. 12, 2017 |
| NS Type | The type of Network Slice | |
| NST Identifier | Identifier of a Network Slice Template that may be used as a basis for building the slice | |
| NS Provider | | PLMN ID |
| NF ID's | Identifiers of the specific NF's within the slice. | UP Anchor ID. The UE may need to be associated with the same UP anchor so that it may use the same address (e.g., IP Address). |
| Service Descriptors | Descriptions of the services that the UE obtained when last connected to the NS. | |
| Data Plane Identifiers | Identifiers what were used to address to the UE when sending data, IP packets, SMS messages, etc. | IP Address, URI, MSISDN, IMSI |
| Token | A token that was provided to the UE when the index was provided to the UE. | A random number or a hash of a random number and the UE's identity. |
| Location | Geographic location information, may be last attachment location info, current location or both | GPS info |
| Mobility | Information about mobility state, may be measured, pre-provisioned mobility mode or rough indication | Pre-provisioned mode: Static/Nomadic/Low-speed/High-speed<br>Measured: current speed<br>Indicator: High/Low speed (state) |
| Security Context | Information that may be used by the Slice to authenticate the UE | If the cookie contained a random security challenge when it was provided to the UE, the UE may insert a challenge response when it is provided back to the network. If the cookie is stored in the network, it may include a random challenge and expected result from the UE. |
| Session Context | Information about each slice data session, such as anchor point and the UE's network ID, IP address, tunnel identifiers that may be associated with the UE's sessions, etc.. | |

Security mechanisms may be employed for the index provided by the UE, and the AN, CN, or Network Slice may use these security mechanisms in retrieving the UE's context. In order to prevent a UE from providing the AN, CN, or Network Slice with a link to invalid context or another UE's context, the UE may first hash, or mathematically combine, the link with its internal identifier (e.g., IMSI). Upon receiving the hashed link, the CCNF, or CCSF, may use the UE's internal identifier to reverse the hash operation and retrieve the link.

If the CCSF reverses the hash operator, then only part of the link maybe hashed so that the CCNF may use the link to determine the CCSF.

Alternatively, for example, instead of hashing the link with the UE's internal identifier, it may be hashed with a key that may be provisioned in the network and the UE, for example in the UE's SIM card.

Similarly, the CCSF or CCNF may hash the link with an internal key or identifier before sending it to the UE. The UE does not need to understand the link or the location that it points to. Therefore the CCSF or CCNF may hash, or encrypt, the link before sending it to the UE.

Figure 10:
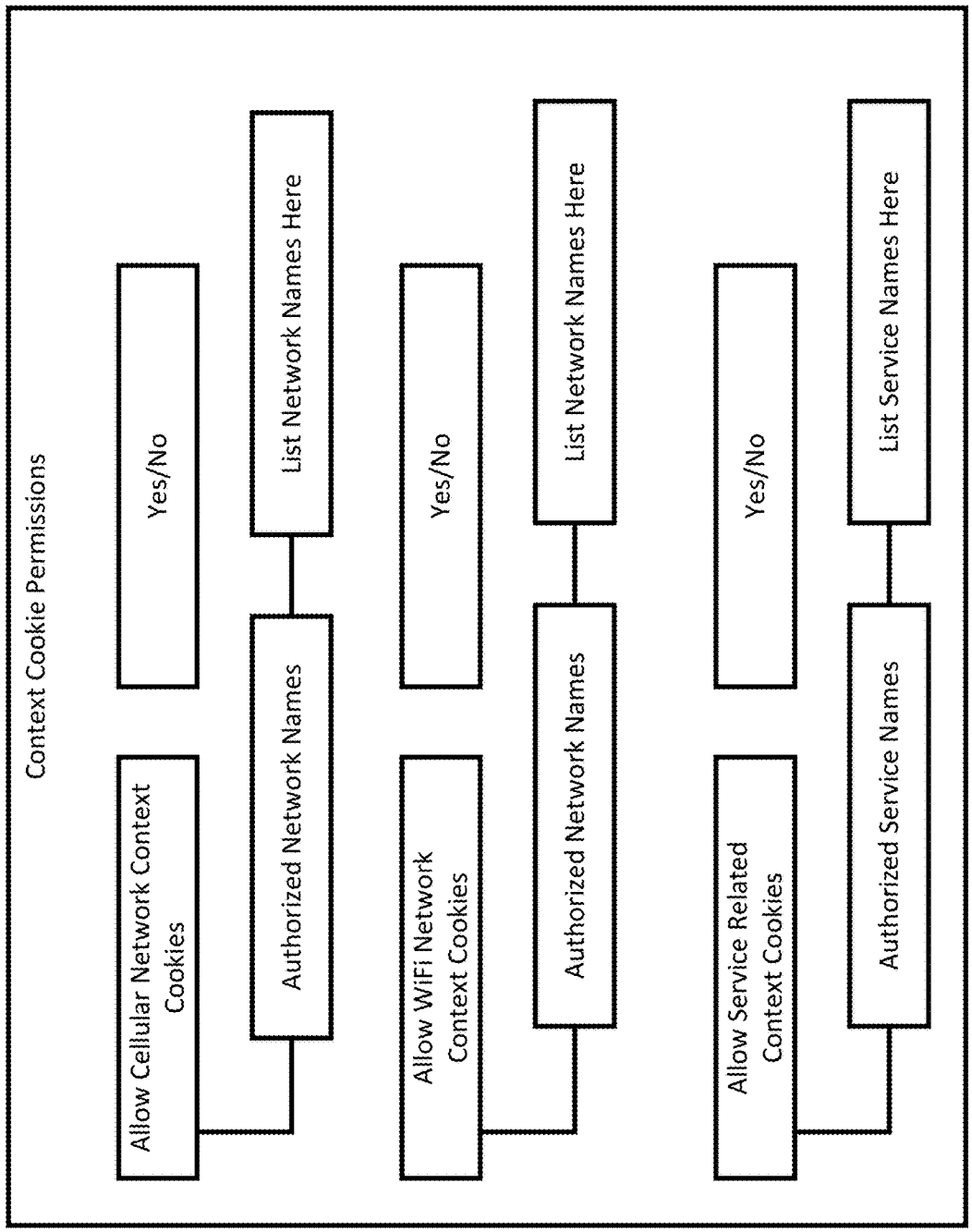
FIG. 10 show an example of a GUI for context cookie configuration.

FIG. 10 shows an example graphical user interface (GUI) that may be displayed by a UE to allow a user to configure how context cookies are handled. In this example, the user may select whether or not cookies are enabled and what types of cookies are enabled. The user may configure the GUI to indicate what networks are allowed to create cookies. The networks may be identified by SSID, PLMN ID, APN, PDN ID, etc., for example.

The user may also configure the GUI to indicate what network slices are allowed to create cookies. A user might not be aware of what a "slice" is, therefore it may configure whether or not cookies may be created and associated with particular services. An example of a service is a high speed internet connection.

A GUI may also be used to configure whether cookies may be stored in the UE or in the network. The UE may provide this indication, or preference, to the network when attaching or associating.

A GUI may also be used to indicate that cookies should only be allowed when a certain type of cookie authorization method is used. For example, a preference may be set that a cookie may only be allowed if they are authenticated with a token.

The GUI of FIG. 10 may be further enhanced to allow the user to specify preferences such as: whether it is preferred to store context cookies in the network or in the UE; the rate at which cookies should be refreshed; and whether to allow the network or other UE applications to access the context cookies for data analytics purposes, for example. Such preferences may be indicated to the network, for example, during an attach, session management, mobility management, or context cookie update activities.

It is understood that any or all of the systems, methods and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include volatile and nonvolatile media, and removable and non-removable media implemented in any non-transitory (i.e., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

We claim:

1. A first apparatus, comprising:
   a processor;
   a memory configured to store computer-executable instructions; and
   communication circuitry, wherein
      the first apparatus is connected to a communications network via the communication circuitry, and
      the processor is configured to execute the computer-executable instructions to:
         determine a third apparatus to store a first context description, wherein
            the first context description pertains to a second apparatus,
            the first apparatus is different from the second apparatus, and
            the third apparatus comprises a first context description storage function entity; and
         send the first context description to the first context description storage function entity located in the third apparatus,
            wherein the first context describes an access network context, a core network context, or a network slice context.

2. The first apparatus of claim 1, wherein the processor is further configured to execute the computer-executable instructions to:
   receive, from the third apparatus, a first index to the first context description stored on the first context description storage function entity;
   receive, from the second apparatus, a first request to re-attach a first connection to the communications network via the first apparatus;
   retrieve, from the third apparatus, the first context description by using the first index; and
   re-attach the first connection using the first context description.

3. The first apparatus of claim 2, wherein the first index is one of a relative index, an identifier of a context description, or a link to a context description.

4. The first apparatus of claim 1, wherein the third apparatus comprises at least one of an access network context description storage function entity, a core network context description storage function entity, or a network slice context description storage function entity.

5. The first apparatus of claim 4, wherein at least one of the access network context description storage function entity, the core network context description storage function entity, or the network slice context description storage function entity is separate from the first apparatus.

6. The first apparatus of claim 1, wherein the processor is further configured to execute the computer-executable instructions to send, to the second apparatus, an indication of the selection.

7. The first apparatus of claim 6, wherein the processor is further configured to execute the computer-executable instructions to:
send, to the second apparatus, the first index;
receive, from the second apparatus, a first request to re-attach the first connection to the communications network via the first apparatus, where the first request comprises the first index.

8. The first apparatus of claim 7, wherein the processor is further configured to execute the computer-executable instructions to:
receive, from the third apparatus, a security token associated with the first index;
send, to the second apparatus, the security token associated with the first index;
receive, from the second apparatus, a security token associated with the first request; and
verify that the security token associated with the first request is consistent with the security token associated with the first index.

9. The first apparatus of claim 1, wherein the processor is further configured to execute the computer-executable instructions to:
receive, from the second apparatus, an indication of a preference of whether to store the first context description in the second apparatus;
determine whether to store the first context description on the first apparatus or on the first context description storage function entity.

10. A first apparatus, comprising:
a processor;
a memory configured to store computer-executable instructions; and
communication circuitry, wherein
the first apparatus is connected to a communications network via the communication circuitry, and
the processor is configured to execute the computer-executable instructions to:
send, to a second apparatus, an indication of a preference of whether to store a first context description in the first apparatus, wherein
the first context description comprises information relating to a context of a first attachment of the first apparatus to the communications network, and
the first context describes an access network context, a core network context, or a network slice context; and
receive, from the second apparatus, an indication of a determination by the second apparatus of a storage location of the first context description.

11. The first apparatus of claim 10, wherein the processor is further configured to execute the computer-executable instructions to:
receive, from a third apparatus, a first index to a first context description stored on a first context description storage function entity; and
send, to the second apparatus, a first request to re-attach a connection to the communications network via the second apparatus, the first request comprising the first index.

12. The first apparatus of claim 11, wherein the first index is one of a relative index, an identifier of a context description, or a link to a context description.

13. The first apparatus of claim 11, wherein the the processor is further configured to execute the computer-executable instructions to:
receive, from the third apparatus, a security token associated with the first index; and
send, to the second apparatus, the security token with the first request.

14. The first apparatus of claim 11, wherein the the processor is further configured to execute the computer-executable instructions to:
store a second index to a second context description stored on a second context description storage function entity, wherein the second context description comprises information relating to a context of a second attachment of the first apparatus to the communications network;
select one of the first index or the second index, wherein the selection is based at least in part on an identifier of the second apparatus; and
send, to the second apparatus, a second request to re-attach a second connection to the communications network via the second apparatus, wherein the second request comprises the selected index.

15. A method, comprising:
selecting, by a first apparatus, a third apparatus to store a first context description, wherein
the first context description pertains to a second apparatus,
the second apparatus is different from the first apparatus, and
the third apparatus comprises a first context description storage function entity; and
sending, by the first apparatus to the first context description storage function entity located in the third apparatus, the first context description,
wherein the first context describes an access network context, a core network context, or a network slice context.

16. The method of claim 15, further comprising:
receiving, from the third apparatus, a first index to the first context description stored on the first context description storage function entity;
receiving, from the second apparatus, a first request to re-attach a first connection to the communications network via the first apparatus;
retrieving, from the third apparatus, the first context description by using the first index; and
re-attaching the first connection using the first context description.

17. The method of claim 16, wherein the first index is one of a relative index, an identifier of a context description, or a link to a context description.

18. The method of claim 15, wherein the third apparatus comprises an access network context description storage function entity, a core network context description storage function entity, and a network slice context description storage function entity.

* * * * *